(12) United States Patent
An et al.

(10) Patent No.: US 10,564,925 B2
(45) Date of Patent: Feb. 18, 2020

(54) USER VOICE ACTIVITY DETECTION METHODS, DEVICES, ASSEMBLIES, AND COMPONENTS

(71) Applicant: Avnera Corporation, Beaverton, OR (US)

(72) Inventors: Jiajin An, Portland, OR (US); Michael Jon Wurtz, Lake Oswego, OR (US); David Wurtz, Portland, OR (US); Manpreet Khaira, Portland, OR (US); Amit Kumar, Portland, OR (US); Shawn O'Connor, Portland, MN (US); Shankar Rathoud, Beaverton, OR (US); James Scanlan, San Francisco, CA (US); Eric Sorensen, Portland, OR (US)

( * ) Notice: Subject to any disclaimer, the term of this patent is extended or adjusted under 35 U.S.C. 154(b) by 0 days.

(21) Appl. No.: 15/711,793

(22) Filed: Sep. 21, 2017

(65) Prior Publication Data
US 2018/0225082 A1 Aug. 9, 2018

Related U.S. Application Data

(60) Provisional application No. 62/456,100, filed on Feb. 7, 2017, provisional application No. 62/459,055, filed
(Continued)

(51) Int. Cl.
*G10L 25/00* (2013.01)
*G06F 3/16* (2006.01)
(Continued)

(52) U.S. Cl.
CPC ............. *G06F 3/165* (2013.01); *G10L 15/08* (2013.01); *G10L 15/22* (2013.01); *G10L 25/84* (2013.01);
(Continued)

(58) Field of Classification Search
CPC ...... G06F 1/3206; G06F 1/3287; G06F 3/165; G06F 11/2221; G10L 21/0208;
(Continued)

(56) References Cited

U.S. PATENT DOCUMENTS

| 5,983,186 A * | 11/1999 | Miyazawa | ............... | G10L 15/26 704/233 |
| 6,453,291 B1 * | 9/2002 | Ashley | ..................... | G10L 25/78 704/200 |

(Continued)

FOREIGN PATENT DOCUMENTS

WO    WO2008/134642    11/2008

OTHER PUBLICATIONS

International Search Report for PCT Application No. PCT/US2018/018075, dated Aug. 13, 2018 in 8 pages.
(Continued)

*Primary Examiner* — Abdelali Serrou
(74) *Attorney, Agent, or Firm* — Knobbe, Martens, Olson & Bear, LLP

(57) ABSTRACT

Many headsets include automatic noise cancellation (ANC) which dramatically reduces perceived background noise and improves user listening experience. Unfortunately, the voice microphones in these devices often capture ambient noise that the headsets output during phone calls or other communication sessions to other users. In response, many headsets and communication devices provide manual muting circuitry, but users frequently forget to turn the muting on and/or off, creating further problems as they communicate. To address this, the present inventors devised, among other things, an exemplary headset that detects the absence or presence of user speech, automatically muting and unmuting the voice microphone without user intervention. Some embodiments leverage relationships between feedback and
(Continued)

feedforward signals in ANC circuitry to detect user speech, avoiding the addition of extra hardware to the headset. Other embodiments also leverage the speech detection function to activate and deactivate keyword detectors, and/or sidetone circuits, thus extending battery.

18 Claims, 5 Drawing Sheets

Related U.S. Application Data on Feb. 14, 2017, provisional application No. 62/532,964, filed on Jul. 14, 2017.

(51) Int. Cl.

| | | |
|---|---|---|
| *G10L 25/84* | (2013.01) | |
| *H04R 1/10* | (2006.01) | |
| *H04R 3/00* | (2006.01) | |
| *G10L 15/08* | (2006.01) | |
| *G10L 15/22* | (2006.01) | |
| *H04R 1/40* | (2006.01) | |

(52) U.S. Cl.
CPC .......... *H04R 1/1041* (2013.01); *H04R 1/406* (2013.01); *H04R 3/005* (2013.01); *H04R 2460/13* (2013.01)

(58) Field of Classification Search
CPC .......... G10L 2021/02165; G10L 25/78; G10L 21/0272; G10L 15/20; G10L 21/0232; G10L 25/93; G10L 2021/02161; G10L 17/26; G10L 2021/02082; G10L 2021/02166; G10L 2021/03643; G10L 2025/786; G10L 21/0205; G10L 21/0264; G10L 25/87; G10L 15/08; G10L 15/22; G10L 19/0204; G10L 2021/02163; G10L 2021/02168; G10L 2025/783; G10L 21/0224; G10L 25/18; G10L 25/84; G10K 2210/1081; G10K 11/16; G10K 11/1781; G10K 11/1785; G10K 11/17885; G10K 2210/3025; G10K 2210/3028; G10K 2210/3035; G10K 2210/3056; Y02D 10/171; H04R 1/1041; H04R 3/005; H04R 1/406; H04R 2460/13; H04R 1/1083; H04R 2201/107; H04R 5/033

See application file for complete search history.

(56) References Cited

U.S. PATENT DOCUMENTS

| | | | | |
|---|---|---|---|---|
| 7,953,596 | B2 * | 5/2011 | Pinto | G10L 21/0208 |
| | | | | 381/71.1 |
| 8,699,719 | B2 * | 4/2014 | Johnson, Jr. | H04R 29/00 |
| | | | | 381/107 |
| 9,980,034 | B2 * | 5/2018 | Kumar | H04R 3/00 |
| 2003/0179888 | A1 * | 9/2003 | Burnett | G10L 21/0208 |
| | | | | 381/71.8 |
| 2003/0228023 | A1 * | 12/2003 | Burnett | G10L 21/0208 |
| | | | | 381/92 |
| 2006/0217977 | A1 * | 9/2006 | Gaeta | G10L 21/0208 |
| | | | | 704/233 |
| 2007/0238490 | A1 * | 10/2007 | Myrberg | H04M 1/6066 |
| | | | | 455/569.1 |
| 2008/0057857 | A1 | 3/2008 | Smith | |
| 2008/0317259 | A1 * | 12/2008 | Zhang | G10L 15/04 |
| | | | | 381/92 |
| 2010/0246845 | A1 * | 9/2010 | Burge | H04R 1/1041 |
| | | | | 381/71.6 |
| 2011/0288860 | A1 | 11/2011 | Schevciw et al. | |
| 2012/0123773 | A1 * | 5/2012 | Zeng | G10L 21/0208 |
| | | | | 704/226 |
| 2014/0072148 | A1 | 3/2014 | Smith et al. | |
| 2014/0270223 | A1 * | 9/2014 | Li | H04R 3/002 |
| | | | | 381/71.6 |
| 2014/0372113 | A1 * | 12/2014 | Burnett | G10L 21/0208 |
| | | | | 704/233 |
| 2015/0039303 | A1 * | 2/2015 | Lesso | G10L 15/28 |
| | | | | 704/233 |
| 2016/0300562 | A1 * | 10/2016 | Goldstein | G10K 11/17815 |
| 2017/0148428 | A1 * | 5/2017 | Thuy | G10L 25/78 |
| 2018/0048768 | A1 * | 2/2018 | Spittle | H04M 9/082 |
| 2018/0268798 | A1 * | 9/2018 | Mustiere | G10K 11/16 |

OTHER PUBLICATIONS

Written Opinion for PCT Application No. PCT/US2018/018075, dated Aug. 13, 2018 in 8 pages.
Cohen, Israel et al., "Two-Channel Signal Detection and Speech Enhancement Based on the Transient Beam-To-Reference Ratio," IEEE, ICASSP 2003, pp. V-233-V236.

* cited by examiner

USER VOICE ACTIVITY DETECTION METHODS, DEVICES, ASSEMBLIES, AND COMPONENTS

RELATED APPLICATIONS

The present application claims priority to U.S. Provisional Patent Applications 62/456,100 filed Feb. 7, 2017; 62/459,055 filed Feb. 14, 2017; and 62/532,964 filed Jul. 14, 2017. All three applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright ©2017, AVNERA CORPORATION.

TECHNICAL FIELD

Various embodiments of the invention relate generally to automatic detection of user voice activity in headsets of various types, such as those with automatic noise reduction.

BACKGROUND

Headsets typically include a microphone along with one or two ear devices or earplugs which are worn over, on, or in the ears of users to facilitate electronic communications. Many contemporary headsets also include automatic noise reduction (ANR) or automatic noise cancellation (ANC) circuitry for automatically sensing and canceling significant portions of ambient noise, thereby improving user listening experience. ANC circuitry is simple in principle, but complex in implementation, with many headsets including as many six microphones (mics): two for feedback (fb) ANC, two for feedforward (ff) ANC, and one or two for picking up user voice signals.

One problem the present inventors have recognized is that while ANC headsets improve the listening experiences of users wearing them, they do little or nothing to improve the quality of the signals being transmitted out of the headset to other devices. For example, in many noisy environments, users wearing headsets with their mobile phones are typically required to manually switch their phones to a mute mode to prevent background noise from being transmitted by the phone to other phones and devices. Although this is effective in preventing the unwanted noise transmission, it often leads to gaps in communications as users who muted their phones forget to unmute them when they start speaking again. Moreover, in conference calls with many users manually muting and unmuting, the potential for communications gaps is even greater.

In attempting to solve the problem, some designers have provided circuitry that monitors the voice mic output and automatically mutes or unmutes based on comparison of the mic output level to one or more thresholds. However, the monitoring circuitry suffers from at least two problems that has inhibited its use in mobile phones. First, it consumes considerable power and thus shortens battery life. Second, the circuitry creates its own communications gaps not only because its slow reaction to speaking stops and starts, but also because it confuses external noises, for example voices of nearby people, with the user voice.

Accordingly, the present inventors have recognized a need for better ways of reducing transmission of ambient noise through ANC and other types of headsets.

SUMMARY

To address one or more of these and/or other needs or problems, the present inventors devised, among other things, one or more exemplary systems, kits, methods, devices, assemblies, and/or components for automatically detecting the presence or absence of user speech and operating associated muting or other voice- or speech-dependent functionality. Some embodiments include a voice mic, at least two control mics, and processing circuitry, with the processing circuitry configured to mute the voice mic based on a relationship of the control mic output signals.

In a first embodiment, the two control mics, for example a left earpiece mounted mic and a right earpiece mounted mic, are configured for approximately symmetric acoustic coupling to a user vocal region. The processing circuitry determines whether a user is speaking based on measured temporal symmetry—for example phase relationship—of output signals from the two mics, with high symmetry indicative of user speech (arriving at both mics approximately simultaneously) and low symmetry indicative of ambient noise or non-user speech. The two control mics in some variants of the first embodiment are the left and right feedback mics in an ANC headset. Some other variants measure or estimate the phase relationship using complex coherence of the sampled mic outputs, activating the muting circuitry whenever the real part of the complex coherence falls below a threshold value.

In a second embodiment, the two control mics are configured for assymetric acoustic coupling to the user vocal region, that is, with one mic having superior acoustic coupling to the user vocal region than the other. The processing circuitry is configured to turn the muting on or off based on the relative magnitude or the energy level of the two mic output signals. For example, in some ANC embodiments, the mic with superior acoustic coupling is the feedback error mic in an ANC earpiece and the other is the feedforward mic. The processing circuitry compares a ratio of feedback error mic output to the feedforward mic output to a threshold in determining whether to turn the muting function on or off. Some variants may use two mics placed on a boom or cord, rather than the ANC control mics.

The processing circuitry compares a ratio of feedback error mic output to the feedforward mic output to a threshold in determining whether to turn the muting function on or off. Some variants may use two mics placed on a boom or cord, rather than the ANC control mics. More generalized embodiments use two or more microphones to produce two signals, with a first signal being more closely coupled to user speech than the second, and the second signal being more closely coupled to ambient noise or sound than the first.

A third embodiment estimates a transfer function that accounts for both the phase and magnitude differences between the signals from two mics, such as the feedback error mic and the feedforward ambient mic. Some variants of this embodiment may lack ANC mic and use other pairs of mics, such as a voice mic and one other mic. The transfer function can be estimated using a variety of methods, such as a Kalman filtering or other form of optimal estimator.

One or more embodiments also include other features. For example, xom embodiments include a canceller to cancel music or other audio signals that are output via a loudspeaker within an earpiece associated with one or more of the microphones. Some embodiments include muting delay and hold functions to reduce risk of muting between spoken words or during short pauses. Still other embodiments include a buffer memory and look-ahead functionality to ensure timely unmuting of the voice mic and thus avoid partial loss of user speech.

BRIEF DESCRIPTION OF THE DRAWINGS

Various embodiments are described herein with reference to the following attached figures (Figs). These figures are annotated with reference numbers for various features and components, and these numbers are used in the following description as a teaching aid, with like numbers referring to the same or similar features and components.

DETAILED DESCRIPTION OF THE EXEMPLARY EMBODIMENT(S)

This document, which incorporates drawings and claims, describes one or more specific embodiments of one or more inventions. These embodiments, which are offered not to limit but only to exemplify and teach the invention, are shown and described in sufficient detail to enable those skilled in the art to implement or practice the invention(s). Moreover, where appropriate to avoid obscuring the invention(s), the description may omit certain information known to those of skill in the art.

Figure 1:
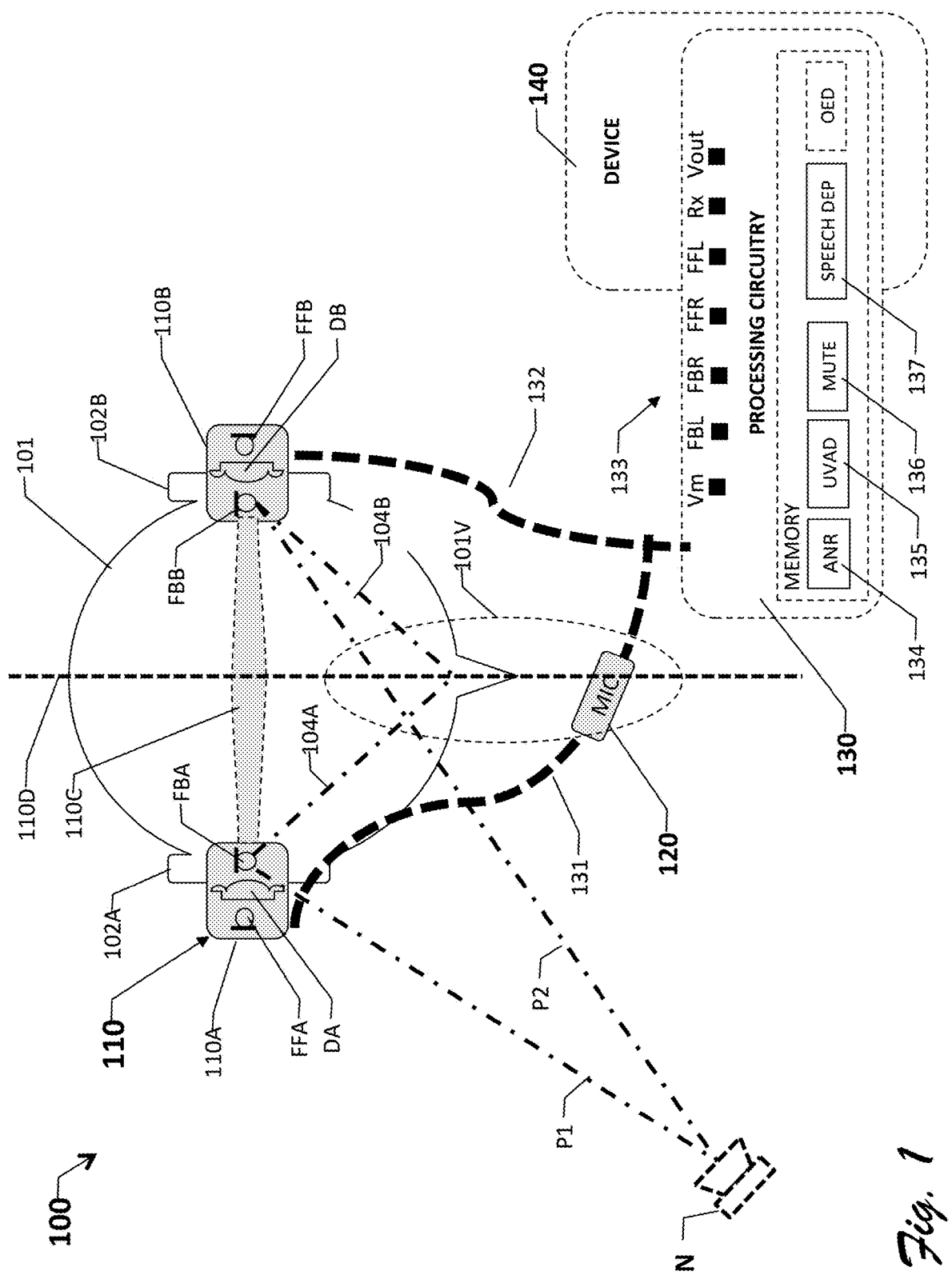
FIG. 1 is a block diagram of an exemplary headset system or assembly 100 corresponding to one or more embodiments of the present invention.

FIG. 1 shows an exemplary ANR headset assembly or system 100 mounted in ears 102A and 102B of a user's head 101 (top view). User head 101 includes respective left and right ears 102A and 102B, a mouth 103, and a user vocal region 104. User vocal region 104 include the user mouth and voice box (not shown.) Assembly 100 includes left and right earpieces 110A and 110B, an optional headband 110C, an in-line or boom voice microphone 120, processing circuitry 130, and a host or external device 140.

Earpieces 110A and 110B, which may take form of in-the-ear, over-the-ear, or on-the-ear configurations and define a perpendicular axis 110D, include respective ANR drivers DA and DB, feedforward mics FFA and FFB, and respective feedback mics FBA and FBB. ANR drivers DA and DB divide the internal volumes of respective earpieces 110A and 110B into front cavity and back cavity portions (not separately labeled). Feedforward ambient mics FFA and FFB are positioned within or adjacent to the back cavities, further away from respective ears 102A and 102B than feedback mics FBA and FBB, ensuring that they provide greater acoustic coupling to ambient noise and lesser acoustic coupling to user head 101, to the user ear canals, and to vocal region 104 than feedback error mics FBA and FBB. Feedback error mics FBA and FBB are positioned similarly within or on their respective earpieces, ensuring generally identical or symmetric acoustic coupling via head or bone (body) conduction paths 104A and 104B to user vocal region 104, which is on axis 110D. Additionally, the feedback mics have a generally symmetric acoustic coupling via air conduction paths P1 and P2 to off-axis external noise sources, such as ambient noise source N. (The feedback and feedforward mics in the same earpiece have a very assymetric response to user speech and ambient.) The microphones and drivers are coupled via respective wired or wireless communication links 131 and 132 to processing circuitry 130. Processing circuitry 130, which in some embodiments take the form of a digital signal processor with associated memory and other integrated componentry fully separated or partially or fully integrated within device 140, includes a set of input/output nodes 133, an ANR processing module 134, a user voice detection module 135, a muting module 136, speech dependent modules 137, and on-the-ear detection module 137.

Input/output nodes 133 includes a voice mic output signal node Vm, a feedback mic left signal node FBA (fbL), a feedback mic right signal node FBB (fbR), a feedfoward mic left signal node FFA (ffL), a feedfoward mic right signal node FFB (ffL), incoming device audio/music signal nodes RxA RxB. (Rx as used herein may refer to the RxA or RxB singly or collectively and may include telephone audio signal.)

ANR processing module 134 provides circuitry and machine-executable instructions for canceling ambient noise within the earpiece front volumes, including within ear cavities of the users. In particular, module 134 receives output signals from feedback mics FFA and FFB, representing a summation of the total acoustic energy within their respective ear canals or cavity. Module 134 also receives an earphone audio signal from device 140, such as smartphone, music player, two-way radio, or other electronic audio source. In response to ambient noise signal from feedforward microphones FFA and FFB, ANR processing circuitry generates noise cancellation signals and sends a mix or sum of the cancellation signals and the earphone audio signal (Rx) to ANR drivers DA and DB, which produces acoustic energy cancelling substantial portions of the perceived ambient noise and providing an acoustic representation of the earphone audio signal. In some embodiments, ANR processing module 134 includes adaptive ANR processing, such as the type described in U.S. patent application Ser. No. 15/069,271 filed Mar. 4, 2016, which is incorporated herein by reference.

User voice activity detection (UVAD) module 135 includes logic circuitry and/or stored machine executable instructions for processing input signals derived from two or more of feedforward mics FFA and FFB and feedback mics FBA and FBB to detect or predict the presence or absence of user speech within the output signal of voice microphone 120. Specifically, the exemplary embodiment provides two methods of detecting user voice activity. (Some embodiments provide a UVAD using any ambient coupled mic in combination with the feedback mic. Thus, for example, the voice mic and the feedback mic could be used.)

The first method leverages the insight that acoustic paths 104A and 104B through the user head are generally equilength and substantially similar in material composition because the user head is sufficiently symmetric. This means the speech component of the feedback mic outputs are substantially identical in magnitude and phase when the user is speaking and substantially different at least in phase when the user is not. In other words, the output signals from the feedback mics have approximately the same speech data components, and thus exhibit high coherence (in phase relationship) when the user is speaking. Moreover, the distance from ambient noise to the two mics are usually not equal or asymmetric, as indicated by paths P1 and P2 in FIG. 1, meaning that the coherence will be rotated in phase. (It still may be coherent, meaning the magnitude may still be very close to 1, but the angle will not be 0, which indicates an 'in-phase' situation.

Thus, the exemplary embodiment uses the complex coherence of the left and right feedback error mic signals fbL and fbR within a threshold test to determine if user voice activity is likely to be present or not. If the threshold criteria is satisfied, then a mute command signal is provided to mute module 136, and if not, an unmute command signs is provided. More specifically, the threshold test takes the form of If mean (real(Cxy(freq_range)))>CT then Unmute; else Mute, where mean ( ) denotes an average function (over frequency); real ( ) denotes the real part of a complex argument; Cxy (freq_range) denotes the complex coherence of signals x and y over a frequency range denoted freq_range; subscript x denotes the fbL error mic signal (left fb mic signal, FBA) and subscript y denotes the fbR error mic signal (right fb mic signal, FBB); CT denotes the coherence threshold. The real part of the complex coherence Cxy is used as this is a measure of how "in phase" the two signals are. Note: abs(Cxy) is 1 if only one average is taken, but this can still be useful as the important information is still in the phase. The freq_range over which the mean is computed can vary. However, because the body-conducted acoustics of the human voice box are primarily low frequency, some embodiments use the range of 70-700 Hz or 100-500 Hz. In response to an indication from the Cxy detector circuitry or logic that the user is not talking (that is user speech is absent), the exemplary embodiment mutes or attenuates the output of one or more microphones, such as the voice mic, and/or the feedforward microphones, using mute module 136.

Also, in some embodiments, the coherence threshold CT is in the range of 0.7 to 0.9, inclusive, with slight variations in performance. Setting it too close to 1 makes the detector more prone to false negatives (speech not detected when it exists) if there is significant background noise, and setting it too low yields more false positives (that is, unmuting when there is no speech. In some embodiments, the coherence threshold may be adjusted dynamically based on system or environmental parameters, such as signal (speech) to noise ratio. That is, if the speech is much stronger than noise, then some embodiments shift the threshold closer to 1, for example 0.9, and if it is very noisy, these embodiments decrease the threshold level to avoid muting user speech. An exemplary threshold between 0.7 and 0.8, such as 0.75, is a good compromise.

This left-right symmetry based approach is effective, but may be vulnerable to on-axis ambient noise which can occur, for example, if a second speaker is on axis with the user (or generally equidistant from the left and right earpieces). (It also suffers from poor signal-to-noise ratio (SNR.) On-axis noise will exhibit high coherence at the feedback error microphones and thus be falsely recognized as speech. Interestingly, one way to confirm this vulnerability is to place a headset using this UVAD approach (for example with left and right feedforward or left and right feedback mics, or more generally two mics configured to be approximately equidistant from the vocal region) on a conventional Head and Torso Simulator (HATS), such as B&K Type 4128-C simulator manufactured by Brüel & Kjær Sound & Vibration Measurement A/S of Nærum, Denmark. The headsets can then be seen to automatically mute in response to noise sources approximately equidistance from the mics, for example, directly in front, behind, and above the HATS.

To reject on-axis ambient noise sources, such as non-user speech, and enable better performance in noisy environments, some embodiments use a second method of user voice activity detection, which has the added advantage of also being useful for a single-earpiece systems, or more generally to any situation where two mics having asymmetric coupling to a user and ambient sound. This method leverages the insight that the magnitude of energy occurring at the feedback mics (more generally, the mic with better acoustic coupling to the user vocal region) is substantially greater than that occurring at the feedforward mics when the user is speaking than when not speaking, due to asymmetry in the acoustic paths of voice signals to the feedback and feedforward mics. The feedback mics are positioned in the front cavity of the earpieces in or near the user ear canal. With this positioning, the feedback mics receive user voice energy via bone conduction paths 104A and 104B with very low attenuation and receive ambient noise via air conduction with strong attenuation due to the seal that is typically present in ANR systems. Therefore, the feedback mic to feedforward mic output ratios (fb/ff energy ratio) when user voice is present is much higher than that of the ambient noise without speech, regardless of the noise direction. To this end, some embodiments determine user voice activity using the following logic:

If fb_left/ff_left<DT then Mute; else Unmute, where the fb_left/ff_left denotes the ratio of the energy in output signal of the left feedback mic (FBA) to the energy in the output signal of the left feedforward mic (FFA), and DT denotes a selected detection threshold for user speech. In this embodiment, DT is platform dependent; however, generally, when the user is speaking, the ratio will increase appreciably over no-speech. (The ratio is a transfer ratio, and in this case is a real number.

Notably, some embodiments may use a complex transfer ratio, which includes both magnitude and phase, and thus provides improved performance. In dealing with a threshold in this complex case, the threshold is no longer a scaler, but a line (perhaps curved or pieced together, that divides the complex plane. For example, a line for the imaginary part >0 could be one threshold. Or the threshold might be that positive real and imaginary parts indicates speech, defining a quadrant of the complex plane.) Note that some embodiments may use the right feedback and feedforward microphones, rather than the left. Still other embodiments may automatically determine whether to use the right or left earpiece. For example, if the left earpiece is removed, on-ear detection circuitry determines that only the right earpiece is in place, and operates the voice detection module based on right feedback and feedforward microphones.

In determining the energy levels in the output of the feedback and feedforward microphones, one can compute a complex transfer function (TF) Txy as Txy=Sxy/Sxx, where Sxy is the cross spectral density between x and y, and Sxx is the power spectral density of x. So Sxy can be estimated via FFTs in the following way:

$$Sxy\_hat=sum(fft(y)*conjugate(fft(x)))/sum(fft(x)*conj(fft(x))).$$

or if only one fft is used (and no averaging) Txy is defined as $$Txy=fft(y)/fft(x)$$

For the ratio of fb (feedback mic) energy to ff (feed forward mic) energy, x is the left feedforward mic signal ffL (FFA) and y is the left feedback mic signal fbL (FBA). The ratio of fb energy to ff energy is actually the $|Tff2fb|^2$.

So in embodiments that use fft's as the core basis, one can threshold the ratio of absolute value squared of the fft result. Or if one were implementing without fft's, one could simply compute a moving average of the sampled time signals, after passing it through a bandpass filter and accomplish the similar results. Using the complex transfer function estimate (Txy.) one can take advantage of the significant phase information.

The detection threshold DT is set generally based on the physical implementation of the earpieces and the quality of seal they provide for the front cavity volume. For a good ANC headphone, one might expect 20 dB of attenuation when the user is not speaking. This rises to roughly 0 dB with the user talking because of the bone conduction mechanism. However, the degree of change is more pronounced in in-the-ear, less pronounced in on-the-ear, and least pronounced in around-the-ear types of headphones, meaning use of different thresholds for each type of headset. For example, in ITE headphones, it is expected that at certain frequencies, such as 100 Hz, there would be approximately 20~30 dB more sound pressure in the blocked ear (fb mic) than outside it (ff mic) due to user speech. This effect can also be leveraged in circumaurals, but the difference in in-ear sound pressure for speech at 100 Hz relative to external sound pressure at feedforward mic is perhaps only a few decibels.

Some embodiments may also vary the threshold dynamically based on measured parameters such as ambient noise or average signal-to-noise ratios, or alternatively provide a user adjustment mechanism via an app hosted by device 140, for example. Some embodiments employ a dynamic detection threshold because the fb/ff ratio is a function of total attenuation within the ANC headset and thus may vary over a fairly wide range. In one embodiment, the detection threshold is estimated during the two-ear smart mute period, specifically as a function of the moving average of energy for mute and the moving average of energy for unmute. Some embodiments measure the attenuation of the system, active plus passive, with the threshold ultimately being a function of the active attenuation.

For the TF estimates, some embodiments update the average conditionally. Also some embodiments recognize that the feedback mic signal includes multiple components, namely audio input signal Rx (from device 140), ambient noise, user speech, and measurement noise. This ensures good signal levels that are uncorrelated with the ambient noise. Alternatively, for estimating the Noise transfer function, some embodiments update the average when the energy ratio of fb/ff is low, or highly correlated, ensuring that the TF estimates converge faster than they otherwise would.

This second approach to user voice activity detection (UVAD) based on the complex transfer characteristic of two control mics within certain frequency range is believed to be particularly robust when used with any two mics that have a transfer characteristic satisfying the following constraints. The first constraint is that the transfer characteristic changes in a significant way for speech compared to interference.

The second constraint is that the transfer characteristic remain relatively clear (i.e., relatively unambiguous) with changes in the relative direction of the interference. These conditions are met with the feedforward and feedback mics in an in-the-ear headset (and in other situations where one mic is more strongly acoustically coupled to the user voice region than the other.)

For ambient noise, the output of the ambient pressure at the ambient mic responds first, has leading phase relative to the ear-coupled feedback mic, for two reasons. One is that it is directly coupled to the ambient and usually closer in acoustic path length to the noise source. Two is that a typical headset earpiece will have some amount of passive attenuation, and this is more or less a sort of low pass filter. i.e. having no difference at very low frequencies, but attenuating the ear coupled mic (fb mic) more significantly as frequencies rise. All causal low pass filters induce a phase lag and all physical filters are causal.

For user speech, besides the acoustic path from the user's mouth to the ear, and then the ear coupled mic, there is another path through the body from the vocal cords. The speed of sound through the body is significantly faster, approximately 4~5 times faster or sub 1 ms versus 3~4.5 milliseconds. (The speed of sound in air is approximately 340 meters/second; in the flesh it is roughly 1500 meters/second; and in skull and bone over 4000 meters per second.) As a result, the sound from the user speech conducted through the users body arrives much sooner than does the air transmission acoustic signal via the mouth.

When looking at the transfer characteristics between an ambient-coupled and ear-coupled mics in close proximity, the ambient microphone will lead ear-coupled mics independent of direction arrival. For user speech, the ear-coupled mic will lead the ambient microphone. Thus it can be clearly seen that asymmetry in complex transfer function (or any other basis) and the lack of large ambiguity caused by the direction of the interference are far superior for the ambient and ear coupled microphones from the same ear.

To take full advantage of the bone conduction path of the ear coupled mic, referred to here as the feedback mic, fb, some embodiments account for incoming audio "Rx" from an external device, such as device 140. (In some embodiments, Rx may be mixed with one or more internally generated audio notification signals, such as beeps or tones indicative of system events, prompts, etc.) This incoming audio will typically have characteristics strongly resembling bone conducted speech, meaning that it has much stronger fb_mic amplitude than the amplitude of the ambient mic (feed-forward mic, ff), and therefore can cause false user-speech detections.

One approach to mitigate this issue is to use an Rx canceller, which mathematically cancels or removes the effect of the Rx signal from the UVAD computations. The exemplary embodiment uses an Rx canceller based on decomposing the fb signal as follows:

$$fb=fb_{Rx}+fb_{ambient}+fb_{speech\_BC},$$

where:
   $fb_{Rx}$ Rx is the fb mic signal that is due to the Rx signal, played out the ear coupled speaker;
   $fb_{ambient}$ is the fb mic signal due to the ambient noise; and
   $fb_{speech\_Bc}$ is the fb mic signal due to bone conduction.
One can also further define fb Rx and fb_ambient as follows:
   $fb_{Rx}=Rx*T_{rx2fb};$
   $fb_{ambient}=ff*T_{ff2fb};$
where $T_{rx2fb}$ is the transfer function from Rx to the fb mic with all other inputs zero and $T_{ff2fb}$ is the transfer function from the feedforward mic to feedback mic with no speech or Rx, and only noise excitation. $T_{rx2fb}$ and $T_{ff2fb}$ can be estimated using several methods. For example, some embodiments use a Kalman filter, or traditional estimate based on the auto and cross spectra with care taken to, for example, not update the averages for Tff2fb when Rx is present. Care also needs to be taken not to update estimates when user speech is present, but this is a much relaxed problem as the UVAD for this step need not catch all speech, but have high confidence that speech is not present.

Once estimates are available for these primarily static transfer functions one can then use them to estimate the $fb_{speech\_BC}$ signal in near real time. The estimates of Trx2fb and Tff2fb would be averaged over time. The exemplary embodiment uses fast fourier transforms (FFTs) to compute the estimates; however, some embodiments use any basis that sufficiently spans the subspace containing the bone conduction information.

Knowing Trx2fb and Tff2fb, one can express $fb_{speech\_BC}$ as $$fb_{speech\_BC} = fb - fb_{Rx} - fb_{ambient}$$

or as $$fb\hat{}_{speech\_BC} = fb - Rx*T\hat{}_{rx2fb} - ff*T\hat{}_{ff2fb}$$

where $fb\hat{}_{speech\_BC}$ is the estimate of $fb_{speech\_BC}$.
Thus, the user speech detection is based on an estimated signal that is primarily free of interference from ambient noise and incoming audio.

Notably this version of the asymmetrical approach (using the same side feedback and feedfoward mics) relies on the bone conduction path between the user vocal region and the feedback mic. Thus, placement of a headset employing this asymmetrical approach on a conventional HATS (such as the B&K 4128-C simulator mentioned above) would generally prevent proper operation of the UVAD, because conventional HATS lack the bone conduction path. In other words, the headset mounted to the HATS would fail to mute and unmute appropriately (or otherwise fail to correctly detect user voice activity) in response to user voice signal of the appropriate frequency range input to the HATS (A path from the vocal region to the feedback mic would exist due to vibration, but this would be very weak coupling in comparison to actual bone conduction.)

Some embodiments combine the symmetry and asymmetry based threshold tests together, as follows:
 if (coherence_of_left_and_right<CT), then Mute;
 else {if ((fb_left/ff_left)<ET, Mute; else Unmute}
Notably, implementing this detection logic entails use of three control mics, the left and right feedback error mics and one of the feedforward mics. Also, this logic only allows the asymmetrical threshold test (the ratio of feedback mic energy to feedfoward mic energy) to control the unmuting. Other embodiments could allow both to trigger unmuting.

Additionally, some embodiments provide buffers within processing circuitry 130 to perform voice detection on a delayed version of the relevant signal data. More specifically, some embodiments employ an X-millisecond look ahead buffer to allow the detector time enough to detect presence of user speech in the headset and unmute the system without loss of any speech content. For example, one embodiment stores 20 millisecond set of sampled data from the system mics, allowing the detector to detect user speech at sample n and then to unmute all prior samples taken in the prior 20 millisecond period, and thus avoid skipping or muting the first part of a user phrase. In some embodiments, the length the look ahead period may be adjusted or calibrated by the user, and in others it may be dynamically determined based on a detected speech cadence of the user, for example a rolling average of distance between peaks in the speech signal.

Mute module 136 provides the muting function in response to the command signals from user voice detection module 135. In some embodiment, this entails turning off the signal paths associated with the voice mic and/or one or more other mics within the assembly. However, to improve user experience, some embodiments delay activation or onset of the mute for 3, 5, 10, 15, or 20 milliseconds, adding a margin of safety to avoid clipping off the ends of phrases or muting between words. In some embodiments, the period of this delay may be set by the user or dynamically determined based on measured speech cadence of the user. Also, in some embodiments, a visual, audible, or haptic indication is provided in response to activation and deactivation of the mute function to alert the user of the change in mute state. In some embodiments, one or more of these indicators are provided on the headset itself and/or on device 140. In some instances, the visual indicator takes the form of an illuminated and/or flashing LED (light emitting diode) on the headset and/or an illuminated or flashing or changed coloration or shape of a microphone icon on the device display. In some embodiments, the user may override the mute function via a manual control element on the headset and/or device, with the override having effect for predetermined time period, for example, 1, 2, or 3 minutes, or until termination of current communication session, such as phone call. At the end of the override period, automatic muting and unmuting would resume.

More generally, some embodiments ramp or deliberately slow down or decay the state changes between mute on and mute off (and vice versa) to avoid very fast microphone gain changes that might otherwise create audible pops or clicks that are annoying and indicative of poor quality audio components. This is generally dealt with by making the gain change gradually rather than instantly. For example, in one embodiment, the "attack" off to on occurs over approximately 100 msec, which is slow enough to avoid pop and long enough to minimize look ahead memory requirements. One embodiment uses a decay function with the following form:

```
If start mute {
    static float decayCoef = 1;
    if (decayCoef > 0.00316) decayCoef *= 0.995    // -25dB
    Scale the output with decayCoef  }
```

Some embodiments facilitate more effective auto-muting by detecting when a two earpiece system has only one ear-piece properly mounted. Some of these embodiments rely on an On Ear Detector (OED) to optimize performance. Details of the OED are further described in co-owned U.S. patent application Ser. No. 14/850,859 filed Sep. 10, 2015, the disclosure of which is incorporated herein by reference in its entirety.

Speech-dependent module 136 represent one or more other functions (of processor circuitry 130 and/or device 140) that receive a binary speech-present or speech-not-present signal from voice activity detection module 135. Some of these modules use the signal to activate or deactivate the function of the module, conserving processing power, memory, and/or battery life. For example, in some embodiments, speech-dependent module 137 includes a speech or keyword recognition module that is configured to listen for specific keyword commands or to perform more generalized speech recognition functions.

In some other embodiments, module 137 further includes a noise-reduction module that provides further processing to reduce noise in the voice mic signal. This noise reduction module, in some embodiments, can be tuned to the specific environment of the user. And in still other embodiments, speech-dependent module 136 includes a side-tone module or circuitry that receives voice mic output and produces a 3-10% user side-tone signal for one or both earpieces. Generating the side-tone consumes power, so switching this function off if the user is not speaking conserves battery life. See U.S. Provisional Patent Application 62/530,049 filed Jul. 7, 2017, which is incorporated herein by reference.

Figure 2:
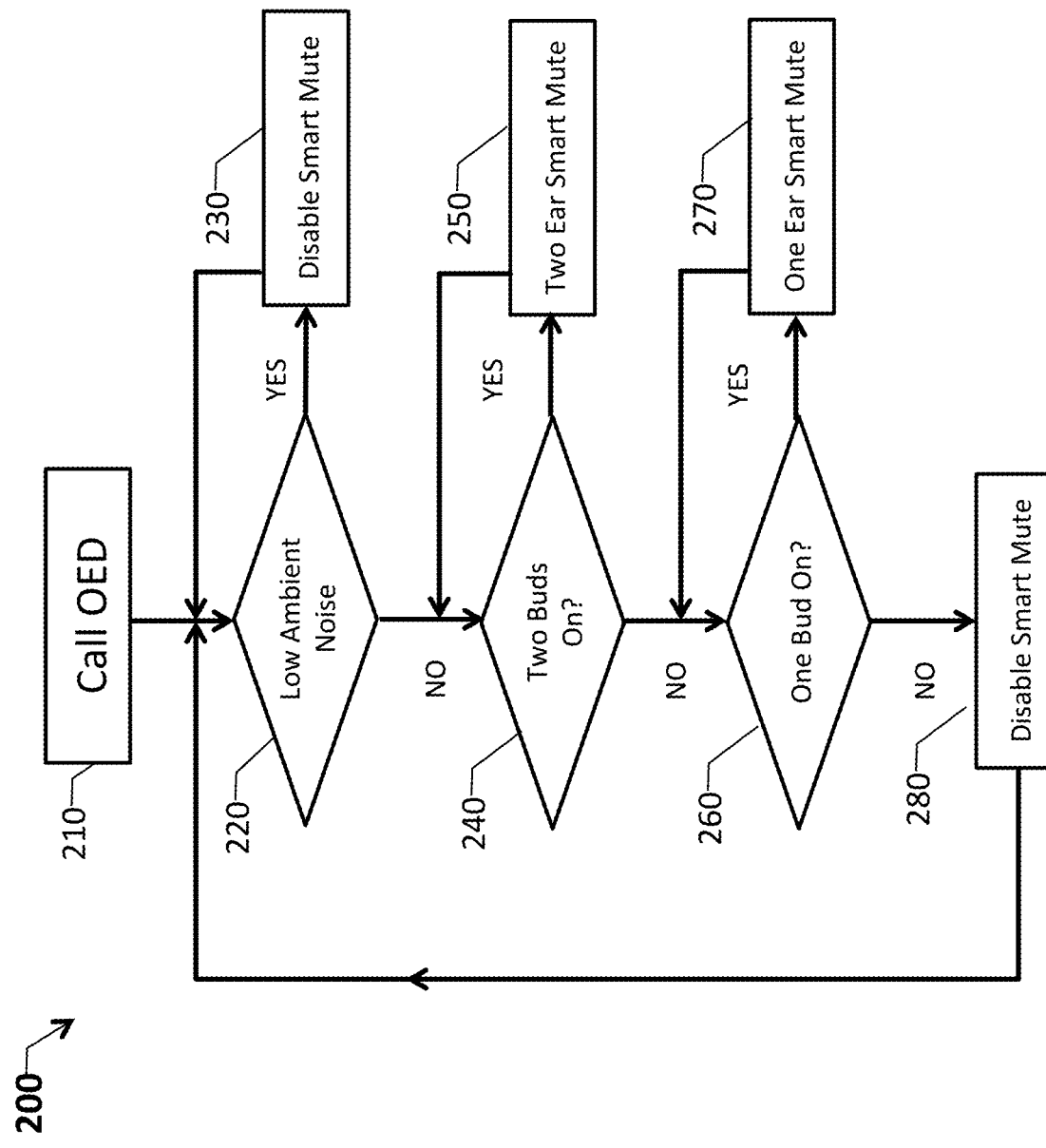
FIG. 2 is a block diagram of an exemplary method of operating a user voice activity detector portion of assembly 100, corresponding to one or more embodiments of the present invention.

FIG. 2 shows a flow chart 200 of an enhanced automatic muting system for a ANR headset with two earpieces, Flow chart 200 includes process blocks 210-280. Block 210 entails performing OED (on-ear detection) to determine the status of the earpieces. (See co-pending U.S. patent application Ser. No. 14/850,859 filed on Sep. 10, 2015), which is incorporated herein by reference.) Execution then continues at block 220 which entails determining whether the ambient noise level is low or not. If the ambient noise is low, the smart mute capability of module 134 is disabled at block 230 and execution returns to block 220; otherwise execution continues at block 240.

Block 240 entails determining whether both earpieces are mounted to the user. In the exemplary embodiment, this entails another call to OED module. If both earbuds are installed, execution branches to block 250 which determines whether to mute or not, using the symmetry based or combined symmetry-asymmetry muting functions described above, both of which require signals from both earpieces. Execution from here cycles back to block 240 to determine if both earpieces are still mounted. If both earbuds are determined not to be mounted, execution proceeds to block 260, which determines whether one earpiece is mounted. (It also determines which one is mounted.) If one is mounted, execution branches to block 270, to perform smart muting function based on the asymmetrical thresholding test as described above. Execution then cycles back to block 260 to determine if one earpiece is still mounted. (In some embodiments, the earpiece may still be mounted, but have insufficient battery power.) If there is not one earpiece mounted, no smart mute is performed and execution branches back to block 220.

Figure 3:
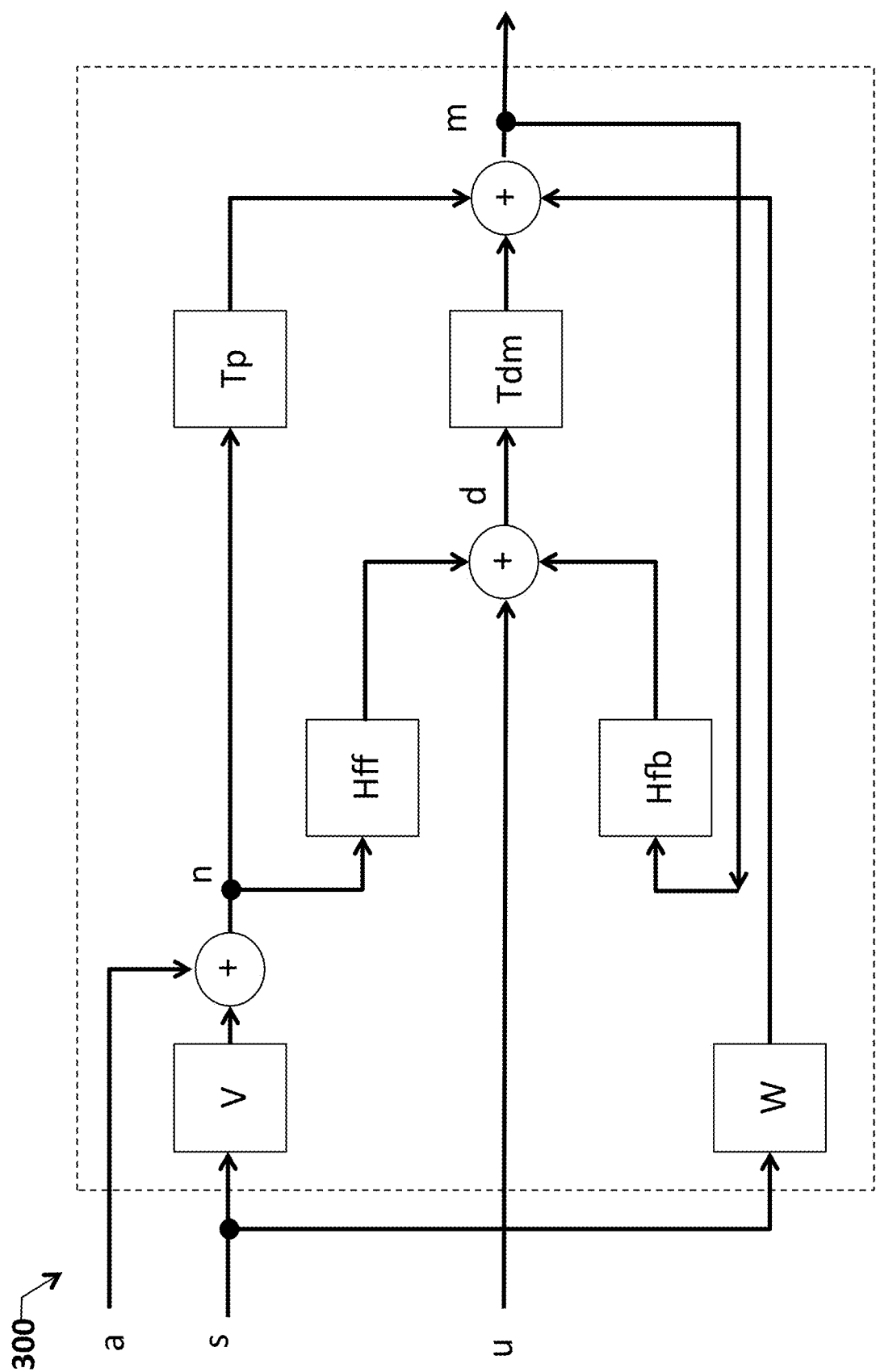
FIG. 3 is a conceptual system diagram of one half of a headset system 300 corresponding to one or more embodiments of the present invention.

FIG. 3 shows a monaural system model 300 of system 100, including the following blocks: $T_p$ is the passive attenuation transfer function; $T_{dm}$ is the driver-to-feedback-mic transfer function; $H_{ff}$ is the feedforward filter; $H_{fb}$ is the feedback filter; V is the user-speech-to-feedforward-mic acoustic path (transfer function); W is the user-speech-to-feedback-mic bone-conduction path (transfer function). The model also includes following signals: s is the user speech signal; a is the ambient noise signal; n is the feedforward mic measurement (or more generally, the mic farthest from or less acoustically coupled to the vocal region); m is the feedback mic measurement (or more generally mic farthest from or more acoustically coupled to the vocal region); u is the RX signal and/or any system audio notification signals; and d is the DAC (driver) output.

More particularly, the FIG. 3 system has both feedforward and feedback filters Hff and Hfb present. However, some embodiments omit these filters, meaning that ($H_{ff}=H_{fb}=0$) and the headset is passive. The exemplary embodiment uses the following linear statistical model:

$M = T_{dm}D + T_p N + W$ $D = H_{fb}M + H_{ff}N + U$ $N = A + VS$

Substituting D into M gives $M = T_{dm}(H_{fb}M + H_{ff}N + U) + T_p N + WS$

Collecting terms yields $(1 - T_{dm}H_{fb})M = (T_{dm}H_{ff} + T_p)N + T_{dm}U + WS$ Substituting N gives $(1 - T_{dm}H_{fb})M = (T_{dm}H_{ff} + T_p)(A + VS) + T_{dm}U + WS$ Collecting terms yields $(1 - T_{dm}H_{fb})M = (T_{dm}H_{ff} + T_p)A + T_{dm}U + ((T_{dm}H_{ff} + T_p)V + W)S$ $M = F_1 A + F_2 U + (F_1 V + F_s)S$ where $$F_1 = \frac{T_{dm}H_{ff} + T_p}{1 - T_{dm}H_{fb}}$$

$$F_2 = \frac{T_{dm}}{1 - T_{dm}H_{fb}}$$

$$F_s = \frac{W}{1 - T_{dm}H_{fb}}$$

The objective in the linear modeling is to decompose the feedback microphone measurement M into a linear combination of independent components (ambient noise, Rx, and user speech). This model is applicable for narrowband signals, i.e. for a particular frequency bin. To model a broadband system one would add frequency indices to each term.

Variances can be expressed as follows:

$E[AA^*] = \sigma_A^2$ $E[SS^*] = \sigma_S^2$ $E[NN^*] = E[(A+VS)(A+VS)^*]$ $E[NN^*] = \sigma_A^2 + VV^*\sigma_S^2$ Again, this is for the narrowband case. Computing the variances at every frequency would yield the Power Spectra of A, S, and N. These variances are instantaneous values: $\sigma_A^2(t)$, $\sigma_S^2(t)$, since ambient noise and speech are non-stationary. The time indices are dropped for notational convenience. Covariance $E[MN^*]$ Is defined as $E[MN^*] = E[(F_1 A + F_2 U + (F_1 V + F_s)S)(A+VS)^*]$ $E[MN^*] = F_1\sigma_A^2 + (F_1 VV^* + F_s V^*\sigma_S^2)$ Which can be rewritten as $E[MN^*] = F_1(\sigma_A^2 + VV^*\sigma_S^2) + F_s V^{-1} VV^*\sigma_S^2$ Note that computing the covariance at every frequency would yield the Cross Power Spectrum.

Regression Coefficient G is defined as $$G = \frac{E[MN^*]}{E[NN^*]} = \frac{F_1(\sigma_A^2 + VV*\sigma_S^2) + F_S V^{-1} VV*\sigma_S^2}{\sigma_A^2 + VV*\sigma_S^2}$$

-continued $$G = F_1 + F_s V^{-1}\left(\frac{b}{1+b}\right)$$

where $$b = \frac{VV * \sigma_S^2}{\sigma_A^2}$$

is the user-speech-to-ambient-noise SNR. Substituting $F_1$ and $F_s$ into G yields $$G = \frac{T_{dm}H_{ff} + T_p}{1 - T_{dm}H_{fb}} + \frac{WV^{-1}}{1 - T_{dm}H_{fb}}\left(\frac{b}{1+b}\right)$$

When user speech is present, the ratio $$\left(\frac{b}{1+b}\right)$$

approaches unity (as the user-speech-to-ambient-noise SNR gets large). When user speech is absent, $$\left(\frac{b}{1+b}\right)$$

is zero. This means that the instantaneous regression coefficient, G(t), lives on a line segment with endpoints $F_1$ and $F_1+F_s V^{-1}$. Note that computing the regression coefficient at every frequency would yield the Transfer Function.

Estimation: Tracking the regression coefficient, G(t), as it changes over time can be a challenging problem. Worse yet is the fact that when Rx is present, the coherence between M and N is reduced, which increases the variance of the estimate. Making use of a reference to U, simplifies the estimation problem, though it is not required. Some embodiments formulate the estimation problem in a state-space framework using the Measurement Model M(t) defined as $$M(t) = G(t)N(t) + H(t)U(t) + \sqrt{\sigma_r} r(t)$$

where r(t) is a Gaussian random variable with zero mean and unit variance, $\sigma_r$ is a tunable parameter that explains unmodeled behavior (i.e. slight nonlinearities in the measurements). H(t) is a regression coefficient that explains the contribution of the rx/music signal to the feedback mic measurement.

Some embodiments use the following process model:

$$\begin{bmatrix} G(t+1) \\ H(t+1) \end{bmatrix} = \begin{bmatrix} \alpha_1 & 0 \\ 0 & \alpha_2 \end{bmatrix}\begin{bmatrix} G(t) \\ H(t) \end{bmatrix} + \begin{bmatrix} (1-\alpha_1^2)^{1/2} & 0 \\ 0 & (1-\alpha_2^2) \end{bmatrix}\begin{bmatrix} q_1(t) \\ q_2(t) \end{bmatrix}$$

where $q_1(t)$ and $q_2(t)$ are independent Gaussian random variables with zero means and unit variances. $\alpha_1$ and $\alpha_2$ are tunable parameters that govern how quickly G(t) and H(t) can change over time.

The state-space framework is useful because there are efficient algorithms for state estimation Recursive Least Square (RLS), Least Mean Square (LMS), and Kalman filter, for example). Some embodiments estimate the states, G(t) and H(t), in several frequency bins by using a Kalman filter in each bin.

Some embodiments incorporate a more generalized approach to user voice activity detection which avoids the need for explicitly characterizing the electroacoustical parameters of the system. The generalized approach uses two signals θ (theta) and φ (phi) which are each a function of at least two of user speech s, ambient noise a, and/or incoming audio u, according to the matrix of transfer functions T. (Incoming audio u can be a mix of externally generated audio signals such as Rx/music from a communication device and internally generated audio signals, such as system event prompts, notifications, or alarms) The matrix T of transfer functions is determined by how speech, ambient and incoming audio u appear on the two or more transducers, and how the transducers are combined with a reference to the Rx/music to generate phi and theta. Mathematically, this can be expressed as $$\begin{bmatrix} \theta \\ \phi \end{bmatrix} = T \begin{bmatrix} s \\ a \\ u \end{bmatrix}$$

where T denotes the matrix of transfer functions, and is defined as $$T = \begin{bmatrix} T_{s\theta} & T_{a\theta} & T_{u\theta} \\ T_{s\phi} & T_{a\phi} & T_{u\phi} \end{bmatrix},$$

wherein $T_{s\theta}$ represents a transfer function from user speech s to signal θ; $T_{a\theta}$ represents a transfer function from ambient noise a to signal θ; $T_{s\Phi}$ represents a transfer function from user speech s to signal Φ; and $T_{a\Phi}$ represents a transfer function from ambient noise a to signal Φ. With this model, reliable detection of user voice activity requires adherence to the following asymmetrical constraint:

$$\left|\frac{T_{s\theta}}{T_{a\theta}} - \frac{T_{s\varphi}}{T_{a\varphi}}\right|^2 > z$$

where z denotes the asymmetry threshold z. Which indicates that the speech-to-ambient sensitivity ratios must be different in magnitude and/or phase. In some embodiments z equals zero and in other embodiments z equals 0.01, 0.1, 0.5, 0.75, 1.0, 2.0. In still other embodiments, z is greater than 2. Mapping the terms of this more generalized model to the specific electroacoustical implementation of FIG. 3, shows the corresponding T matrix as $$T = \begin{bmatrix} \dfrac{W}{1 - T_{dm}H_{fb}} & \dfrac{T_{dm}H_{ff} + T_p}{1 - T_{dm}H_{fb}} & \dfrac{T_{dm}}{1 - T_{dm}H_{fb}} \\ V & 1 & 0 \end{bmatrix}$$

where $$T_{s\theta} = \frac{W}{1 - T_{dm}H_{fb}}, \; T_{a\theta} = V, \; T_{a\theta} = \frac{T_{dm}H_{ff} + T_p}{1 - T_{dm}H_{fb}}, \; T_{a\phi} = 1,$$

$$T_{a\phi} = \frac{T_{dm}}{1 - T_{dm}H_{fb}}, \; T_{u\phi} = 0.$$

Some embodiments may use an alternative asymmetrical constraint of the form $$\left|\frac{Ts\theta}{Ta\theta}\right|^2 > \left|\frac{Ts\varphi}{Ta\varphi}\right|^2$$

which requires that the ratio of speech to ambient signal power in signal θ is greater than the ratio of speech to ambient signal power in signal Φ.

Figure 4:
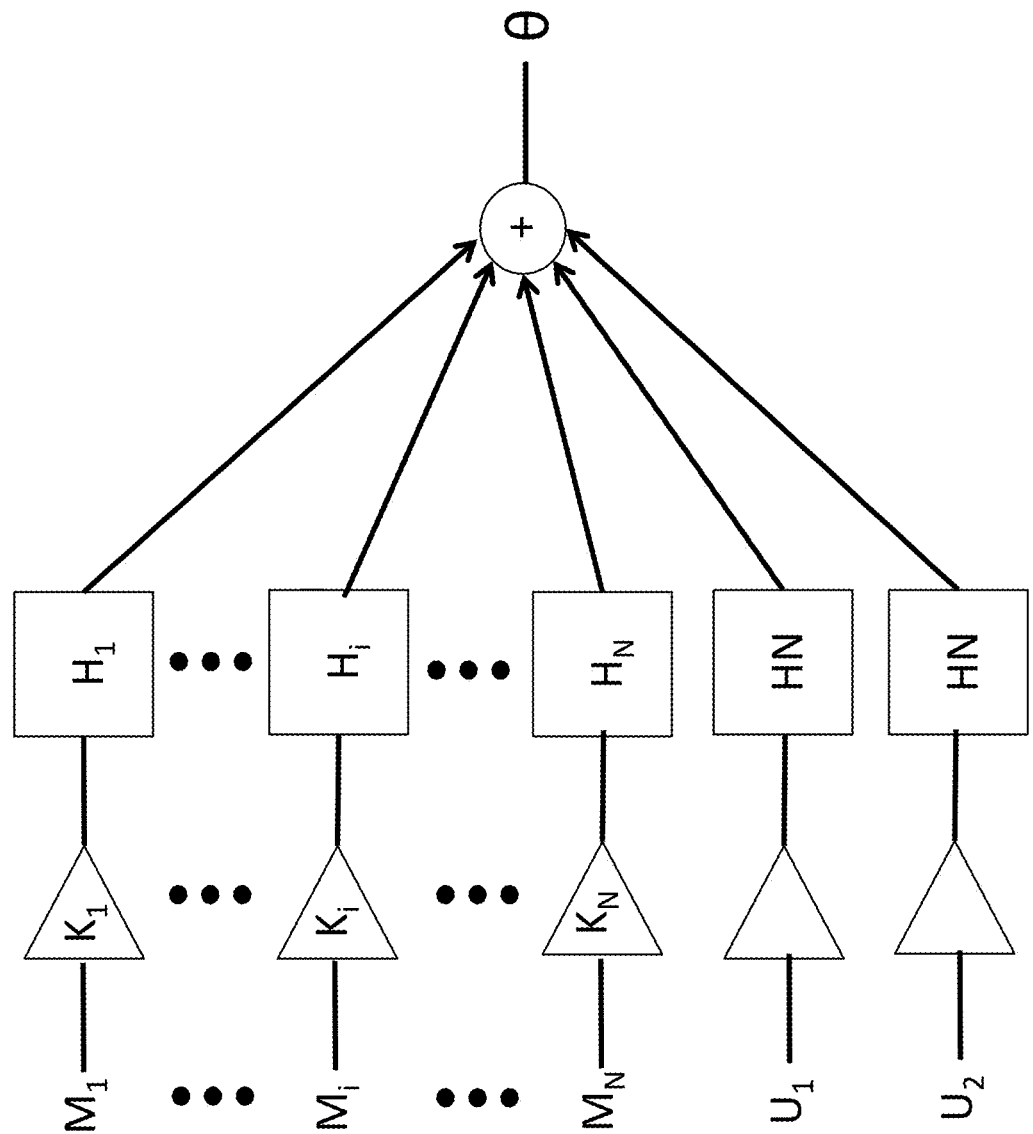
FIG. 4 is a block diagram of an generic electroacoustic system having multiple audio transducers and audio input signals, corresponding to one or more embodiments of the invention.

FIG. 4 shows a block diagram of a general electroacoustical system 400 illustrating generation of signal θ from a linear combination of mic inputs and Rx/music (incoming audio) inputs. System 400 includes a set of microphone or transducer measurements or inputs $M_1 \ldots M_N$ and Rx/music signal references U1 and U2 which are provided via respective gain modules or blocks $K_1$-$K_N$ to filters H having respective transfer functions $H_1$-$H_N$. The filter outputs feed into a summer, which produces theta. Thus, signal θ is a filtered combination of the transducer and reference inputs.

Figure 5:
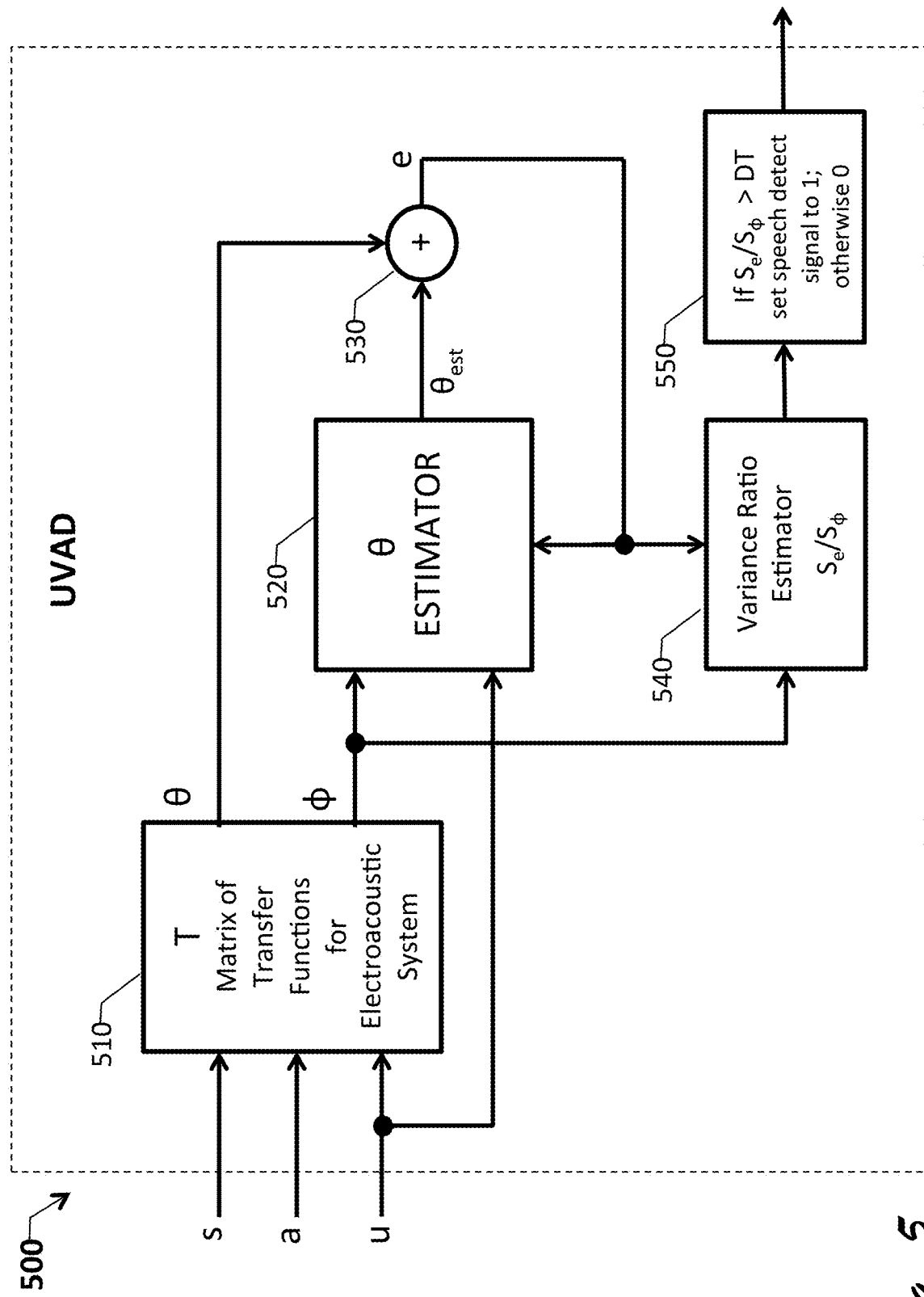
FIG. 5 is a block diagram of an user voice activity detector corresponding to one or more embodiments of the invention.

FIG. 5 shows a block diagram of generalized UVAD module 500 which can be uses as part of UVAD module 135 and within the FIG. 2 process. In addition to input signals user speech s, ambient noise a, and incoming device audio u, module 500 includes an electroacoustic system model block 510, estimator block 520, summer 530, variance ratio estimator block 540, and decision block 550. Electroacoustic system model block 510 is generally representative of T, the matrix of transfer functions T and any electroacoustic system, such as system 100 or 500.

Estimator block 520 iteratively predicts or estimates (theta) from phi and u, with prediction error signal e from summer block 530 being fed back to update each new prediction. In the exemplary embodiment, estimator block 520 takes the form of a Kalman filter (as described above). However, other embodiments user forms of linear estimators, such as RLS and LMS estimators. θΦ.

Variance ratio estimator block 540 estimates the variance for the prediction error, $S_e$ and the variance of signal Φ, $S_\Phi$, and computes the ratio $S_e/S_\Phi$. The ratio is provided to decision block 550, which compares the ratio to detection threshold DT. If the ratio exceeds the threshold the user voice activity detection signal is set to 1 indicating the presence of user speech. Otherwise, the detection signal is set to 0.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising", "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A communication assembly comprising:
an incoming audio signal node configured for connection to a communication device that provides an incoming audio signal;
signal processing circuitry configured to output a voice activity detection signal indicative of a determined absence or presence of user speech, the signal processing circuitry configured to determine absence or presence of user speech based on a first signal ϕ, a second signal θ, and a third signal, with the ϕ and θ signals derived from two or more transducers responsive to at least ambient noise a, user speech s, and the third signal, with the ϕ and θ signals satisfying a constraint $$\left|\frac{T_{s\theta}}{T_{a\theta}} - \frac{T_{s\varphi}}{T_{a\varphi}}\right|^2 > 0,$$

$T_{s\theta}$ representing a transfer function from user speech s to signal θ, $T_{a\theta}$ representing a transfer function from ambient noise a to signal θ, $T_{s\Phi}$ representing a transfer function from user speech s to signal ϕ, $T_{a\phi}$ representing a transfer function from ambient noise a to signal ϕ, and the third signal based at least in part on the incoming audio signal or at least one audio notification signal.

2. The communication assembly of claim 1, wherein the two or more transducers include first and second microphones, with the first microphone positioned with substantially greater acoustic coupling to a user vocal region than the second microphone.

3. The communication assembly of claim 2, wherein the first microphone is positioned to receive more acoustic energy from the user vocal region via a bone conduction path than the second microphone.

4. The communication assembly of claim 1, further comprising an automatic muting module configured to attenuate a voice microphone output signal in response to the voice activity detection signal indicating a determined absence of user speech and to de-attenuate the voice microphone output signal in response to the voice activity detection signal indicating presence of user speech.

5. The communication assembly of claim 1, wherein the automatic muting module is configured to mute or attenuate the voice microphone output signal a predetermined amount of time after receipt of the voice activity detection signal.

6. The communication assembly of claim 1, further comprising a keyword recognition module configured to recognize one or more keywords within user speech signals derived from a voice microphone output signal and responsive to the voice activity detection signal indicating a determined absence of user speech to enter a shutdown or sleep state to conserve power or memory.

7. The communication assembly of claim 1, further comprising a side tone module responsive to user speech to provide a side tone signal to a loud speaker within a headset earpiece and responsive to the voice activity detection signal indicating a determined absence of user speech to enter a shutdown or sleep state to conserve power or memory.

8. The communication assembly of claim 1, further comprising a noise reduction module responsive to the voice activity detection signal indicating a determined presence of user speech to reduce noise in a first way and responsive to the voice activity detection signal indicating a determined absence of user speech to reduce noise in a second way.

9. The communication assembly of claim 1, further comprising at least one speech-dependent module configured for operation in a manner dependent on speech content of a voice microphone output signal and responsive to the voice activity detection signal indicating a determined absence of user speech to enter a power and/or memory conservation mode.

10. The communication assembly of claim 1, further comprising a first node configured for connection to a loud speaker associated with a headset earpiece, a second node configured for connection to a feedforward ambient microphone associated with the headset earpiece, and a third node configured for connection to a feedback error microphone associated with headset earpiece, the signal processing circuitry coupled to the first, second and third nodes, and configured to provide an anti-noise signal to the loud speaker in response to signals originating from the feedforward ambient microphone and the feedback error microphone, and the $\phi$ and $\theta$ signals derived from signals originating from the feedforward ambient microphone and the feedback error microphone.

11. The communication assembly of claim 10, wherein the signal processing circuitry is further configured to indicate absence of the user speech when the first and second transducers are placed on a standard head and torso simulator (HATS) that is outputting a speech signal in the range.

12. The communication assembly of claim 10, wherein the headset earpiece in an in-the-ear earpiece having an ear-canal portion containing the feedback error microphone.

13. A method of operating a communication assembly having a voice microphone output signal and a set of two or more transducers, the method comprising:

determining whether a user of the communication assembly is speaking based on the output of the two or more transducers by deriving a first signal $\phi$ and a second signal $\theta$, with the $\phi$ and $\theta$ signals derived from the two or more transducers transducing an ambient noise signal a, user speech signal s, and a third signal, with the $\phi$ and $\theta$ signals satisfying a constraint $$\left| \frac{T_{s\theta}}{T_{a\theta}} - \frac{T_{s\varphi}}{T_{a\varphi}} \right|^2 > 0,$$

$T_{s\theta}$ representing a transfer function from user speech s to signal $\theta$, $T_{a\theta}$ represents a transfer function from ambient noise a to signal $\theta$, $T_{s\Phi}$ representing a transfer function from user speech s to signal $\phi$, $T_{a\phi}$ representing a transfer function from ambient noise a to signal $\phi$, and the third signal a function of at least an incoming audio input signal from an external device or at least one audio notification signal; and in response to a determination that the user is not speaking, changing the operating state of one or more speech-dependent modules associated with the communication assembly to a resource conservation state.

14. The method of claim 13, wherein the one or more speech-dependent module includes at least one of:

a muting module configured to mute the voice microphone output signal in response to the determination that the user is not speaking;

a keyword recognition module configured to recognize one or more spoken words or phrases; and a side tone module configured to generate a side tone signal based on the voice microphone output signal.

15. A communication assembly comprising:

first and second transducers configured to be worn on a user head, with the first transducer configured for substantially greater acoustic coupling to a user vocal region than the second transducer; and signal processing circuitry configured to output a voice activity detection signal indicative of a determined absence or presence of user speech in a predetermined frequency range when the first and second transducers are mounted to a user head, the assembly including an earpiece having a loud speaker, a feedforward ambient microphone, a feedback error microphone, a voice microphone, and an incoming audio signal node configured for connection to a communication device that provides an incoming audio signal, the signal processing circuitry configured to determine absence or presence of user speech based on a first signal $\phi$, a second signal $\theta$, and a third signal, with the $\phi$ and $\theta$ signals derived at least from output signals of at least two of the feedforward ambient microphone, the feedback error microphone, and the voice microphone in response to ambient noise a, user speech s, and the third signal, with the $\phi$ and $\theta$ signals satisfying a constraint $$\left| \frac{T_{s\theta}}{T_{a\theta}} - \frac{T_{s\varphi}}{T_{a\varphi}} \right|^2 > 0,$$

$T_{s\theta}$ representing a transfer function from user speech s to signal $\theta$, $T_{s\theta}$ representing a transfer function from ambient noise a to signal $\theta$, $T_{s\Phi}$ representing a transfer function from user speech s to signal $\Phi$, $T_{a\phi}$ representing a transfer function from ambient noise a to signal $\phi$, and the third signal based at least in part on incoming audio signal or at least one audio notification signal.

16. The communication assembly of claim 15 wherein
the signal processing circuitry is further configured to indicate absence of user speech when the first and second transducers are positioned on a standard head and torso simulator (HATS) that is outputting a speech signal in the predetermined frequency range.

17. The communication assembly of claim 15 wherein the processing circuitry is further configured to provide an anti-noise signal to the loud speaker in response to signals originating from the feedforward ambient microphone and the feedback error microphone, and the assembly further including a set of one or more speech-dependent modules, with each speech dependent module responsive to the voice activity detection signal indicating absence of user speech to enter a power or memory conservation state and responsive to the voice activity detection signal indicating presence of user speech to exit the power or memory conversation state.

18. The communication assembly of claim 17 wherein the set of one or more of the speech-dependent modules includes a voice microphone output module configured to output a voice microphone signal to the communication device, a keyword recognition module configured to recognize one or more spoken words or phrases, and a side tone module configured to generate a side tone signal based on the voice microphone output signal.

* * * * *